US011769331B2

(12) United States Patent
Crona et al.

(10) Patent No.: US 11,769,331 B2
(45) Date of Patent: Sep. 26, 2023

(54) SIDE VIEW CAMERA DETECTING WHEELS

(71) Applicant: Kapsch TrafficCom AG, Vienna (AT)

(72) Inventors: Björn Crona, Jönköping (SE);
Christian Karlström, Jönköping (SE);
Emile Van Bergen, Tranås (SE); Simon Ljungvall, Taberg (SE); Simon Börjesson, Jönköping (SE)

(73) Assignee: KAPSCH TRAFFICCOM AG, Vienna (AT)

( * ) Notice: Subject to any disclaimer, the term of this patent is extended or adjusted under 35 U.S.C. 154(b) by 302 days.

(21) Appl. No.: 17/326,265

(22) Filed: May 20, 2021

(65) Prior Publication Data

US 2021/0365748 A1 Nov. 25, 2021

(30) Foreign Application Priority Data

May 22, 2020 (EP) .................................... 20176003

(51) Int. Cl.
*G06V 20/54* (2022.01)
*G06T 7/20* (2017.01)
*G06F 18/25* (2023.01)

(52) U.S. Cl.
CPC ............ *G06V 20/54* (2022.01); *G06F 18/251* (2023.01); *G06T 7/20* (2013.01); *G06T 2207/20221* (2013.01); *G06T 2207/30236* (2013.01)

(58) Field of Classification Search
CPC ...... G06V 20/54; G06V 20/64; G06V 20/647; G06V 20/653; G06V 2201/12; G06V 10/25; G06V 30/147; G06V 10/24; G06V 30/146; G06V 10/247; G06V 30/1607; G06T 2207/30236; G06T 2207/30248; G06T 2207/30252; G06T 2207/30242; G06T 2200/04; G06T 2200/08; G06T 17/00; G06T 15/00; G06T 2210/12; G06T 7/20; G06T 11/005; G06T 3/00; G08G 1/015; G08G 1/017; G06F 18/00
See application file for complete search history.

(56) References Cited

U.S. PATENT DOCUMENTS

2003/0184778 A1   10/2003   Chiba
2015/0269444 A1    9/2015   Lameyre et al.

OTHER PUBLICATIONS

Extended European Search Report received for European Patent Application No. 20176003.0, dated Oct. 30, 2020, 13 pages.
(Continued)

*Primary Examiner* — Sumati Lefkowitz
*Assistant Examiner* — Michael Adam Shariff
(74) *Attorney, Agent, or Firm* — Weaver IP L.L.C.

(57) ABSTRACT

A method for detecting wheels of a vehicle on a road comprises directing a vehicle classification sensor onto a section of the road and recording a 3D representation of the vehicle, directing a camera onto the section and recording a source 2D image, determining a bounding box circumscribing the 3D representation, a side and four corner points of said bounding box side, identifying corner points in a source 2D image plane, defining four corner points of a rectangle in a destination 2D image plane, calculating a projective transformation between the source corner image points and the destination corner image points, transforming source 2D image pixels to destination 2D image pixels of a first destination 2D image, and detecting the wheels using the destination 2D image.

21 Claims, 4 Drawing Sheets

(56) References Cited

OTHER PUBLICATIONS

Brazil et al., "M3D-RPN: Monocular 3D Region Proposal Network for Object Detection", IEEE/CVF International Conference on Computer Vision (ICCV), 2019, pp. 9286-9295.
Gothankar et al., "Circular Hough Transform Assisted CNN Based Vehicle Axle Detection and Classification", The 4th International Conference on Intelligent Transportation Engineering, IEEE, 2019, pp. 217-221.
Radmehr et al., "Homography-Based Vehicle Pose Estimation from a Single Image by Using Machine-Learning for Wheel-Region and Tire-Road Contact Point Detection", Second International Conference, ICSM, 2019, pp. 169-179.

SIDE VIEW CAMERA DETECTING WHEELS

CROSS-REFERENCE TO RELATED APPLICATIONS

This application claims priority to European Patent Application No. 20 176 003.0, filed on May 22, 2020, the entirety of which is incorporated herein by reference.

BACKGROUND

Technical Field

The present disclosed subject matter relates to a method for detecting wheels of a vehicle on a road, which wheels are visible on a side of the vehicle.

Background Art

Detecting and counting the number of wheels visible on a vehicle side allows, e.g., to deduce the presence of axles and their number and is an important task in ITS (Intelligence Transportation Systems) and vehicle tolling applications when vehicles shall be monitored, directed or tolled depending on the number of wheels or axles. For example, different toll rates may apply for vehicles with different numbers of wheels/axles such as passenger cars, light and heavy trucks. Accurately detecting and determining the number of wheels/axles of a vehicle is critical to avoid false charges.

Hitherto, wheels/axles of vehicles were either detected with pressure transducers in the road surface, light barriers across the road, dedicated side view cameras or as a by-product of VDC (Vehicle Classification and Detection) sensors mounted overhead the road, such as stereoscopic cameras or laser scanners. Pressure transducers are difficult and costly to install. Light barriers and dedicated side view cameras suffer from a small field of view and vehicle occlusion, e.g., by another vehicle on a lane closer to the light sensor or camera or people on the pavement. Mitigating these problems by directing a camera obliquely onto the road induces perspective distortions such that wheels may not be reliably detected with present image recognition processes, not to mention a discrimination of wheels raised from the road or double wheels. The image resolution of VDC sensors is usually too low for accurate wheel detection, particularly for detecting raised wheels. Stereoscopic cameras are sensitive to camera noise, and laser scanners are "blind" to certain materials.

BRIEF SUMMARY

It is an object of the disclosed subject matter to provide a method for detecting wheels of a vehicle on a road with high accuracy and small installation costs in existing ITS or tolling scenarios.

To this end, the disclosed subject matter provides for a method of detecting wheels of a vehicle on a road, said wheels being visible on a side of the vehicle, comprising, for a first position of the vehicle on the road:

directing a vehicle classification sensor from a sensor position, in a given coordinate system, onto a section of the road and recording, with the vehicle classification sensor, a 3D representation of at least a part of the vehicle passing the section;

directing a first camera from a first camera position, in the given coordinate system, onto the section and recording a source 2D image, comprised of pixels representing points in a source 2D image plane, of at least a lower portion of said vehicle side, said camera being calibrated by a mapping between world points in the given coordinate system and image points in said source 2D image plane;

determining, in the given coordinate system, a bounding box circumscribing the 3D representation, a side of the bounding box corresponding to said vehicle side, and the four corner points of said bounding box side;

identifying, using said mapping, image points of said corner points in said source 2D image plane as source corner image points;

defining a destination 2D image plane in the coordinate system, and the four corner points of a rectangle in the destination 2D image plane as destination corner image points;

calculating a projective transformation between the source corner image points and the destination corner image points;

transforming, using the projective transformation, source 2D image pixels to destination 2D image pixels of a first destination 2D image; and detecting the wheels of the vehicle using the first destination 2D image by means of an image recognition process.

The disclosed subject matter combines the absolute mounting, calibrating and imaging accuracy of a 2D side view camera with the relative modelling accuracy of a 3D classification sensor. This allows to obtain depth information about pixels in the source 2D image in order to transform these pixels to an undistorted "straight view" destination 2D image. As a result any wheel captured in the source 2D image can be detected in the undistorted destination 2D image with the accuracy of the recorded source 2D image. 2D cameras with high resolution are commercially available at low cost. Moreover, implementing the inventive method in an existing ITS or tolling environment needs very few additional installations such as mounting a low cost 2D camera at the side of the road in the vicinity of an existing 3D classification sensor.

The calibration of the camera by the mapping enables correlating source corner image points with corner points in the 3D representation. Determining a bounding box in the 3D representation circumscribing the 3D representation provides for rectangular sides and eliminates statistical fluctuations and measurement errors in the 3D representation in terms of parallelism. This renders possible a precise determination of the bounding box side and the coordinates of the four corner points of the bounding box side, and a precise subsequent identification of the four corner points in the source 2D image plane possible. Defining the four destination corner image points to span a rectangle in the destination 2D image plane not only allows to calculate the sought perspective transformation, but—due to the known "real world" coordinates of the corner points in the 3D representation—also to easily assign "real world" lengths in the destination 2D image plane. Even corner points in the source 2D image plane which are not recorded by the camera can be used to calculate the projective transformation.

Consequently, after transforming source 2D image pixels, undistorted wheels are shown and their detection is eased. The ease in detection by means of the image recognition process is actually twofold: Firstly, it is easier for image recognition tools to detect undistorted wheels in an image than distorted ones. Secondly, due to said known real world lengths between the four destination corner points a real world size of wheels can be deduced from the destination 2D image and standardised destination 2D images may be used, e.g., showing a 20 m×5 m section of the destination 2D image plane.

The bounding box may be determined in any way known to the skilled person, e.g., by employing neural networks, clustering methods, rotating callipers, etc., it may be an axis-aligned bounding box, e.g., with edges normal to the road, and can also be determined from several subsequent vehicle positions. To determine the side of the bounding box corresponding to the vehicle side showing the wheels, any way of exploiting information about points in the 3D representation and the camera position known to the skilled person may be used, e.g., utilising vectors between the corner points of the bounding box and the camera position/direction or predetecting the wheels—albeit with a low resolution—in the 3D representation, etc.

In a first computationally less demanding embodiment of the disclosed subject matter said bounding box side is determined as a vertical side of the bounding box which is closest to the camera position. In this case, e.g., only the distances between one or several points, for example corner points of the bounding box or centre points of vertical bounding box sides, and the camera position have to be determined and the side with the shortest distance(s) is chosen as said bounding box side.

In a second, more accurate embodiment of the disclosed subject matter a vehicle movement vector is measured by the vehicle classification sensor and said bounding box side is determined as a vertical side of the bounding box which is parallel to the vehicle movement vector and faces the camera. This embodiment is especially suited when 3D representations for several vehicle positions are recorded such that the movement vector, e.g., of the bounding box, a side or a distinguished point like a centre of mass in the 3D representation, is easily determined. In this embodiment an erroneous determination of a front or rear side of the vehicle as the side which should show the wheels is significantly reduced.

Generally the image recognition process used to detect the wheels of the vehicle in the destination 2D image may comprise any image recognition technique known in the state of the art, e.g., LDA/QDA (linear/quadratic discriminant analysis), maximum entropy classifiers, decision trees/lists, kernel estimation, naïve Bayes classifiers, cluster analysis, etc. as well as combinations thereof. In an embodiment of the disclosed subject matter the image recognition is carried out by means of a neural network trained on perspective-corrected, standardised images of vehicle wheels. As the inventors have found out a such trained neural network significantly outperforms neural networks trained on perspective-distorted images not related to any physical distances regarding classification and recognition certainty.

Due to the precise transformation of the high resolution source 2D image it is possible to reliably extract additional information which may, e.g., be used for tolling or directing a vehicle in ITS. The disclosed subject matter provides for three combinable embodiments extracting such information: In one embodiment, by means of the image recognition process for each detected wheel it is detected whether this wheel is raised from the road. In a further embodiment, by means of the image recognition process, for each detected wheel it is detected whether it is a double wheel. And in another embodiment the detected wheels are counted. As already mentioned above, the size of a wheel can be easily determined, too.

As known to the skilled person a projective transformation calculation requires at least four pairs of corresponding points in the source and destination 2D image planes to be transformed into one another. However, in a favourable embodiment of the disclosed subject matter at least one additional point, optionally on an edge of said bounding box side, is determined, at least one corresponding additional source image point is identified using said mapping, and said projective transformation is calculated also between the at least one additional source image point and the at least one corresponding additional destination image point. This entails solving an overdetermined system, compensates for measurement errors and, hence, renders the projective transformation more precise. Of course, multiple additional points may be used analogously as well for calculating the projective transformation to augment this compensation.

Any number of source 2D image pixels may be transformed to destination 2D image pixels, e.g., only the lower half of the source 2D image or only pixels corresponding to points in the bounding box side having less than a certain vertical distance, e.g., of 2 m, above the lower edge of the bounding box side. In an advantageous embodiment of the disclosed subject matter at least those pixels in the source 2D image which lie within a tetragon spanned by the source corner image points are selected for the transforming. This ensures that all the pixels of the source 2D image showing the side of the bounding box are transformed to the destination 2D image plane, providing maximal information about the bounding box side and, thus, easing the subsequent image recognition process.

Performing the projective transformation can change the local pixel density, i.e., the number of pixels in a certain region around each pixel may differ in the source and destination 2D image planes. For example, transforming a regular equidistant grid of source 2D image pixels will yield a destination 2D image plane with a locally varying resolution. In order to counterbalance this effect the disclosed subject matter provides for two special embodiments. In the first one, in the step of transforming, additional destination 2D image pixels are interpolated from the destination 2D image pixels. In this way additional pixel values of intermediate points between transformed destination 2D image pixels are obtained and the pixel resolution is increased. In addition or alternatively thereto, in a second embodiment, in the step of transforming, several transformed source 2D image pixels are averaged to a destination 2D image pixel. In this way one destination 2D image pixel can represent several source 2D image pixels, mitigating the problem of a too dense pixel population within a region in the destination 2D image. Using either one or both of those special embodiments allows to obtain a regular equidistant grid of pixels in the destination 2D image plane.

Up to now, one destination 2D image has been obtained from one source 2D image corresponding to a first position of the vehicle on the road. The method, however, is not restricted to using only one vehicle position and/or only one camera. In a further embodiment of the disclosed subject matter the method further comprises:

repeating the steps of recording, determining, identifying, defining, calculating and transforming, for a second position of the vehicle on the road or with a second camera from a second camera position, to obtain a second destination 2D image; and stitching the first and the second destination 2D images to a stitched destination 2D image;

wherein said step of detecting is carried out using the stitched destination 2D image.

This allows to use two less perspectively distorted source 2D images instead of one more perspectively distorted source 2D image and, therefore, mitigates the above-mentioned resolution differences. In this way, insufficiently resolved regions in the resulting stitched destination 2D image can be avoided. The stitching further allows to detect all the wheels/axles of long vehicles in one stitched destination 2D image. In certain circumstances this may even allow the detection of wheels/axles of vehicles which are partly occluded during their passing of the section, e.g., by another vehicle on a lane closer to the camera. Moreover, due to the above-mentioned possibility of assigning real world lengths in the first and the second destination 2D images the stitching process may be eased, e.g., when aligning the destination 2D images.

In one embodiment, for said stitching, an overlapping region between the first and second destination 2D images is determined and for destination 2D image pixels therein weights are assigned which are used to calculate pixels in the overlapping region in the stitched destination 2D image. For example, real world length information in the first and second destination 2D images may be utilized to determine the overlapping region. The weighting facilitates, e.g., a continuous transition from the first to the second destination 2D image, an elimination of artefacts, a prioritisation of the first or second 2D destination image having a higher resolution, better lighting conditions, better contrast, etc.

In a variant thereof, the weight for a destination 2D image pixel is calculated by:

determining, in the 3D representation, a point corresponding to said pixel, a ray from the camera position to said point, and an angle of incidence of said ray onto said bounding box side; and calculating said weight in dependence of said angle.

Using a ray incidence angle on the bounding box side provides a measure of "straight view" such that pixels can be weighted accordingly, e.g., by decreasing the weights of pixels with a more oblique incidence angle typically representing a larger spatial region and having a lower spatial resolution. The ray incidence point corresponding to the pixel in consideration for weighting can be easily and efficiently determined, e.g., by exploiting the real world space information in the destination 2D image plane or by using the mapping and the projective transformation.

In order to ease the transformation and optional stitching process, in one embodiment all the pixels in the source 2D image are selected for said transforming. This is especially suited when first and second destination 2D images are to be stitched, as overlapping regions outside of said bounding box side might be helpful for the stitching process.

Optionally, more than two cameras, each directed from different camera positions and/or at different angles may be used to record, for one or several vehicle positions, source 2D images which are transformed to destination 2D images and subsequently stitched.

Generally, any number of destination 2D images, e.g., for more than two vehicle positions or recorded with more than two cameras, may be stitched to a common stitched destination 2D image. In this case, if an overlapping region between more than two destination 2D images exists, weights may be assigned for destination 2D image pixels in this overlapping region and used to calculate pixels in the common stitched destination 2D image.

BRIEF DESCRIPTION OF THE DRAWINGS/FIGURES

The disclosed subject matter will now be described by means of exemplary embodiments thereof with reference to the enclosed drawings, in which show.

DETAILED DESCRIPTION

Figure 1:
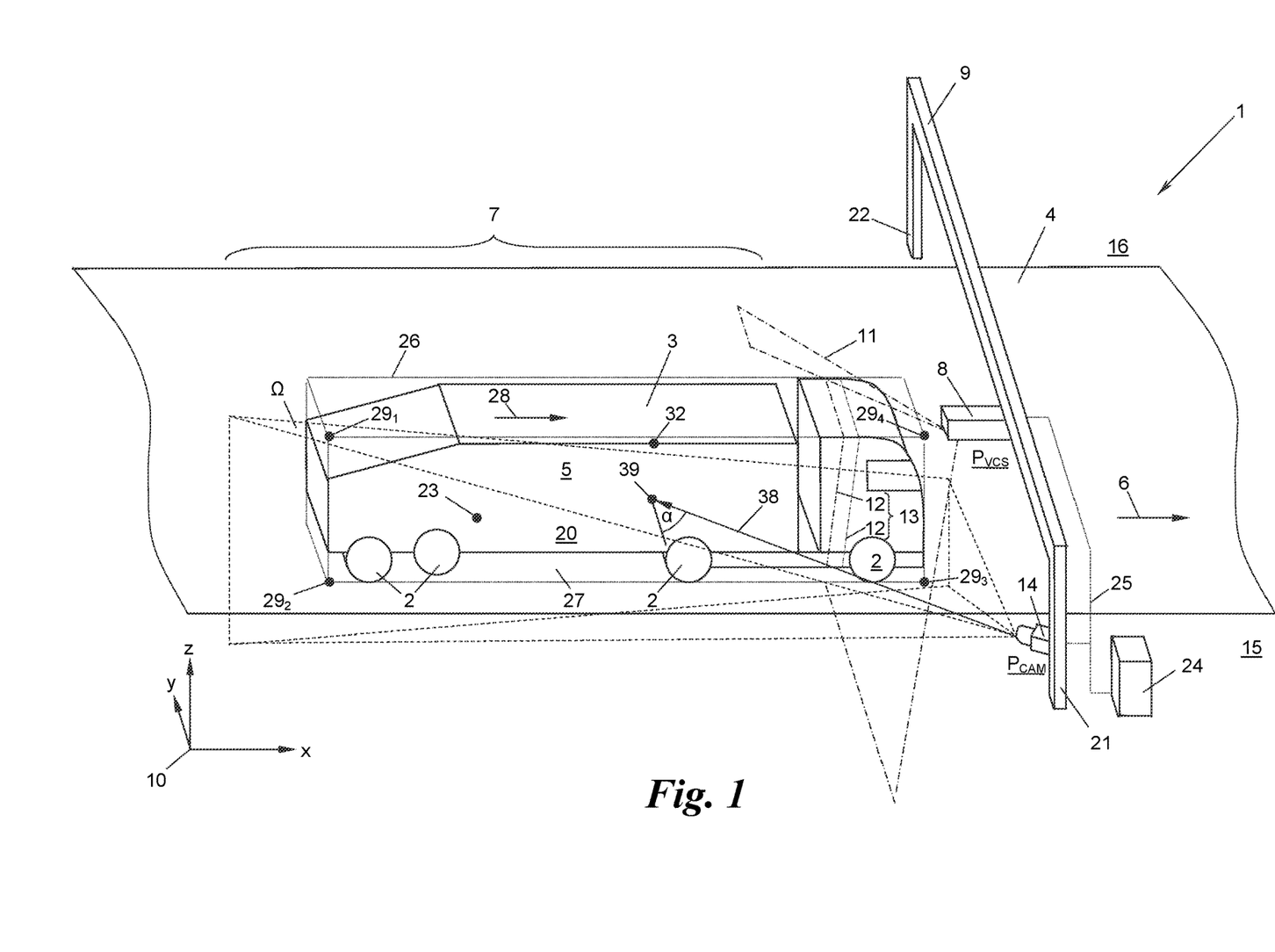
FIG. 1 an apparatus performing the method of the disclosed subject matter in a schematic perspective view.

FIG. 1 shows an apparatus 1 for detecting wheels 2 of a vehicle 3 on a road 4. The wheels 2 of the vehicle 3 are visible on the left or right lateral side 5 of the vehicle 3. The road 4 has a direction of travel 6. During the detection of its wheels 2 the vehicle 3 is usually passing a section 7 of the road 4 in the direction 6, but the vehicle 3 could also be at rest within the section 7.

The apparatus 1 comprises a vehicle classification sensor 8 mounted, e.g., above or besides the road 4 on a gantry 9 spanning the road 4. The position of the road 4 and the position $P_{VCS}$ of the vehicle classification sensor 8 within a given coordinate system 10 are known.

The vehicle classification sensor 8 can be a stereoscopic camera, a radar scanner, a laser scanner or generally any sensor which is capable of recording a 3D representation of the vehicle 3 in the section 7 from its sensor position $P_{VCS}$. If the classification sensor 8 is a laser scanner, it projects, e.g., a fan 11 of light rays onto the road 4. From reflections of the light rays of the fan 11 the shape of the vehicle 3 can be recorded in the sensor 8, e.g., by time-of-flight or interference measurements on the projected and reflected light rays. When only moving vehicles 3 shall be scanned the light ray fan 11 can be kept stationary, and the pass of the vehicle 3 yields a sequence of scan lines 12 the entirety of which form a 3D representation 13 of at least a part of the vehicle 3 in the coordinate system 10, which part comprises a portion of the vehicle side 5. When also stationary vehicles 3 shall be scanned, the light ray fan 11 can be swept, e.g., in the direction of travel 6, to scan a vehicle 3 at rest in the section 7. The 3D representation 13 may be recorded by a reconstruction of several subsequent measurements performed for several vehicle positions and/or several subsequent measurement times, e.g., by transforming, merging, stitching, interpolating or extrapolating points measured by the vehicle classification sensor 8.

The apparatus 1 further comprises a camera 14 directed from a known camera position $P_{CAM}$ at one of the sides 15, 16 of the road 4 onto the section 7. The camera 14 has an angle of aperture Ω and records a source 2D image 17 (FIG. 2a) of the scene appearing within its angle of aperture Ω.

Figure 2A:
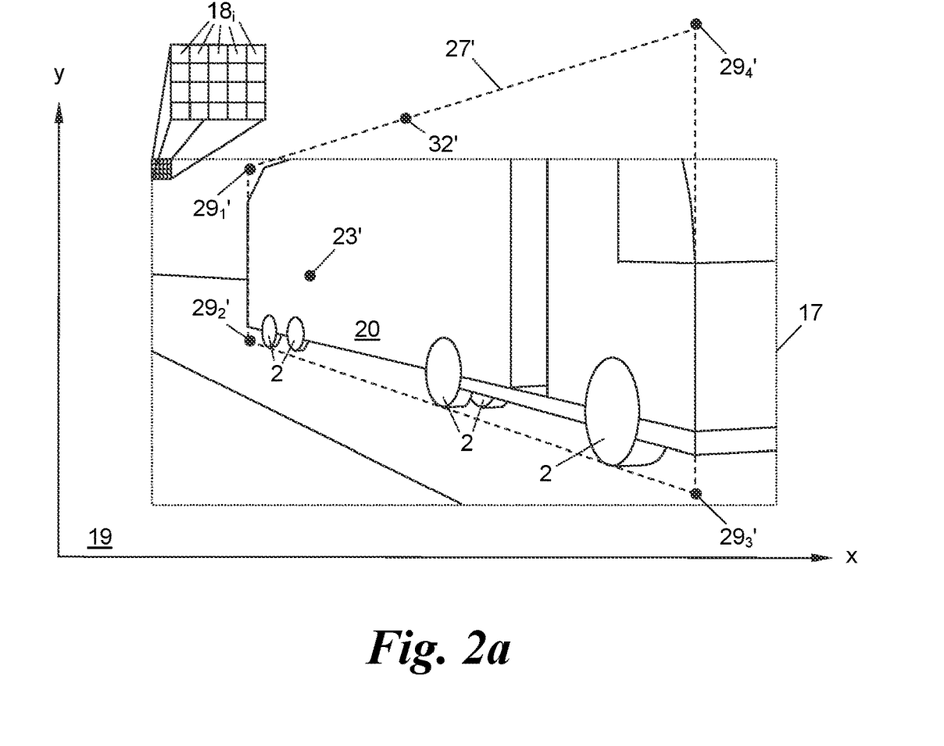
FIG. 2a a source 2D image plane with a perspective-distorted source 2D image recorded with the apparatus of FIG. 1.

As can be seen in FIG. 2a, the source 2D image 17 is comprised of pixels $18_i$ each having at least one pixel value indicating a greyscale, colour and/or transparency information, and a pixel position indicating its position x, y in a source 2D image plane 19. The camera position $P_{CAM}$ and the angle of aperture Ω of the camera 14 are chosen such that the source 2D image 17 comprises—when a vehicle 3 is within the angle of aperture Ω—at least a lower portion 20 of the vehicle side 5 which shows the wheels 2.

The camera 14 can be of any type which is capable of recording a 2D image of a scene, e.g., a still or video camera with a CCD or CMOS chip. The resolution of the camera 14, can, e.g., be HD (High Definition) with 1920 pixels×1080 pixels, or 4K with 3840 pixels×2160 pixels, etc. The camera 14 can be mounted on the same gantry 9 on which the vehicle classification sensor 8 is mounted, e.g., on one of the side pillars 21, 22 of the gantry 9, or on a separate pillar or post (not shown). The camera 14 with its angle of aperture Ω is directed onto the section 7 such that source 2D images 17 recorded by the camera 14 are perspectively distorted, as can been seen in FIG. 2a, which makes the detection of wheels/axles therein difficult or prone to errors. To overcome this problem, the following measures are taken.

The camera 14 is calibrated by a mapping such that any arbitrary world point 23 within the angle of aperture Ω in the coordinate system 10 can be identified as an image point 23' in the source 2D image plane 19 (FIG. 2a). The mapping can be obtained by any method known in the art considering intrinsic camera parameters such as focal length, image sensor format, principal point, etc. and/or extrinsic camera parameters such as the camera position $P_{CAM}$ and the orientation of the angle of aperture Ω in the coordinate system 10, etc., e.g., by a Direct Linear Transformation (DLT) method, a Perspective-n-Point (PnP) method, a Unified PnP (UPnP) method or the like.

The apparatus 1 comprises a processor 24 connected to both the vehicle classification sensor 8 and the camera 14. The processor 24 receives, over data connections 25, the recorded 3D representation 13 from the vehicle classification sensor 8 and the recorded source 2D image 17 from the camera 14 and processes those according to the method shown in FIG. 4 and explained under reference to FIGS. 1, 2a, 2b, 3a, 3b and 3c in the following. It goes without saying that the processor 24 or a part thereof can be integrated into the vehicle classification sensor 8 and/or the camera 14, and other parts of the processor 24 or the entire processor 24 could even be installed at a remote location.

Figure 4:
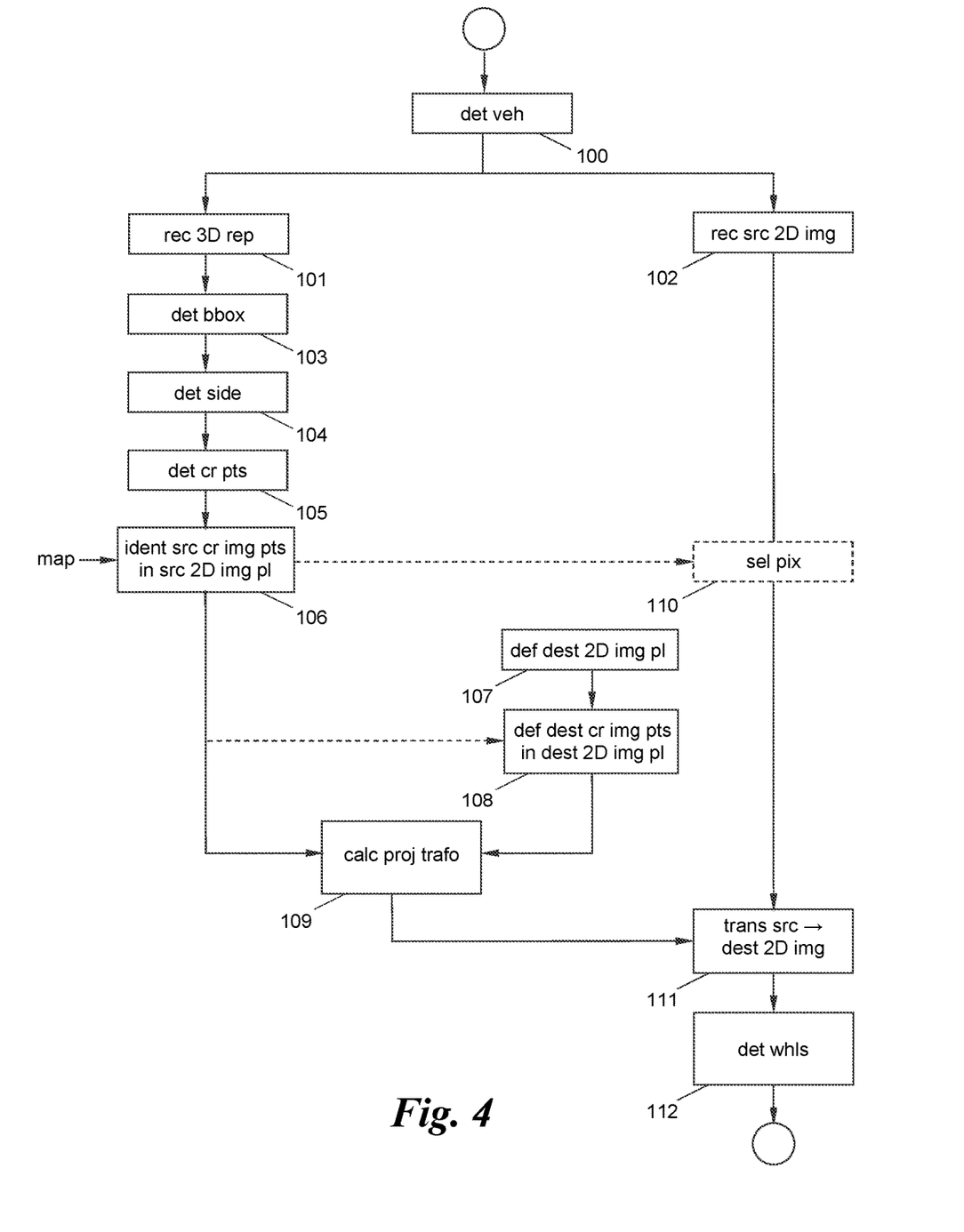
FIG. 4 a flow chart of the method of the disclosed subject matter.

Turning to FIGS. 1 and 4, in a first step 100, the presence or passing of a vehicle 3 in or along the section 7 of the road 4 is detected. Detecting the vehicle 3 triggers the recording of the 3D representation 13 of the vehicle 3 by means of the vehicle classification sensor 8 (step 101) as well as the recording of the source 2D image 17 by means of the camera 14 (step 102).

Detecting the vehicle 3 in step 100 can be made, e.g., with a dedicated vehicle detector such as a pressure switch or transducer in the road 4, a light barrier across the road 4 etc. Alternatively, the camera 14 itself can be used as vehicle detector in step 100, e.g., when an image processing of a source 2D image 17 indicates the presence of the lower portion 20 of the vehicle 3 in the source 2D image 17. Furthermore, also the vehicle classification sensor 8 itself can be used as a vehicle detector in step 100, e.g., when the reflected light ray fan 11 indicates the presence of a vehicle 3 in the section 7.

It is not necessary that the 3D representation recording step 101 and the source 2D image recording step 102 are done simultaneously, i.e., step 101 can be performed before or after step 102, as long as the 3D representation 13 and the source 2D image 17 correspond to the same position of the vehicle 3 on the road 4 and/or to the same recording time. The 3D representation 13 may, e.g., be recorded in step 101 based on several positions of the vehicle 3 and may later be reconstructed ("synchronised") for the vehicle position for which the source 2D image 17 was recorded in step 102. Such a synchronisation may be performed, for example by assigning timestamps to 3D representations 13 and source 2D images 17 in steps 101 and 102 and comparing the respective timestamps. This may be particularly useful in case of a static fan 11.

In step 103, a bounding box 26 circumscribing the recorded 3D representation 13 of the vehicle 3 (or a part thereof) is determined in the coordinate system 10. The bounding box determining step 103 is performed by any minimum bounding box procedure known in the state of the art, e.g., using rotating callipers techniques, clustering approaches, neural networks, etc.

Next, in step 104 a side 27 of the bounding box 26 corresponding to the vehicle side 5 (or a part thereof) where the wheels 2 are visible is determined. In a first variant this bounding box side 27 is determined as that vertical side of the bounding box 26 which is closest to the camera position $P_{CAM}$. This is done, e.g., by comparing the distances from points contained in sides of the bounding box 26, for example from the centre of side 27, to the camera position $P_{CAM}$. Alternatively, in a second variant the classification sensor 7 measures a vehicle movement vector 28, e.g., by comparing the movement of the 3D representation 13 or the bounding box 26 over time. Then, the side 27 can be determined as a vertical side, i.e., vertical in the coordinate system 10 or vertical with respect to the road 4, of the bounding box 26 which is parallel to the vehicle movement vector 28 and faces the camera 14.

Of course, the side 27 of the bounding box 26 may be determined in many other ways using the available information, e.g., by identifying—albeit with a poor resolution—vehicle wheels 2 in the 3D representation 13, by considering vectors between points of the 3D representation 13 and the camera 14, or by iterating the following steps for several bounding box sides and selecting that side as the bounding box side 27 for which wheels 2 are detected, etc.

In a subsequent step 105, the four ("world") corner points $29_1$-$29_4$ of the bounding box side 27 in the coordinate system 10 are determined.

Following step 105, in step 106 the mapping of the camera calibration is applied to the four world corner points $29_1$-$29_4$ to identify their corresponding four source corner image points $29_1'$-$29_4'$ (FIG. 2a) in the source 2D image plane 19. As can been seen in FIG. 2a, the source corner image points $29_1'$-$29_4'$ do not necessarily lie within the source 2D image 17 and usually do not form the corners of a rectangle but of a perspective-distorted tetragon 27'.

In a step 107, which can be performed at any time before, during or after steps 100-106, a destination 2D image plane 30 is defined in the coordinate system 10 in such a way that a destination 2D image 31 (FIG. 2b) lying in this plane 30 will provide on orthogonal ("straight") and hence as much as possible undistorted view onto the side 5 of the vehicle 3. The destination 2D image plane 30 is, e.g., chosen parallel to the bounding box side 27 and at a suitable normal distance to the camera position $P_{CAM}$.

Figure 2B:
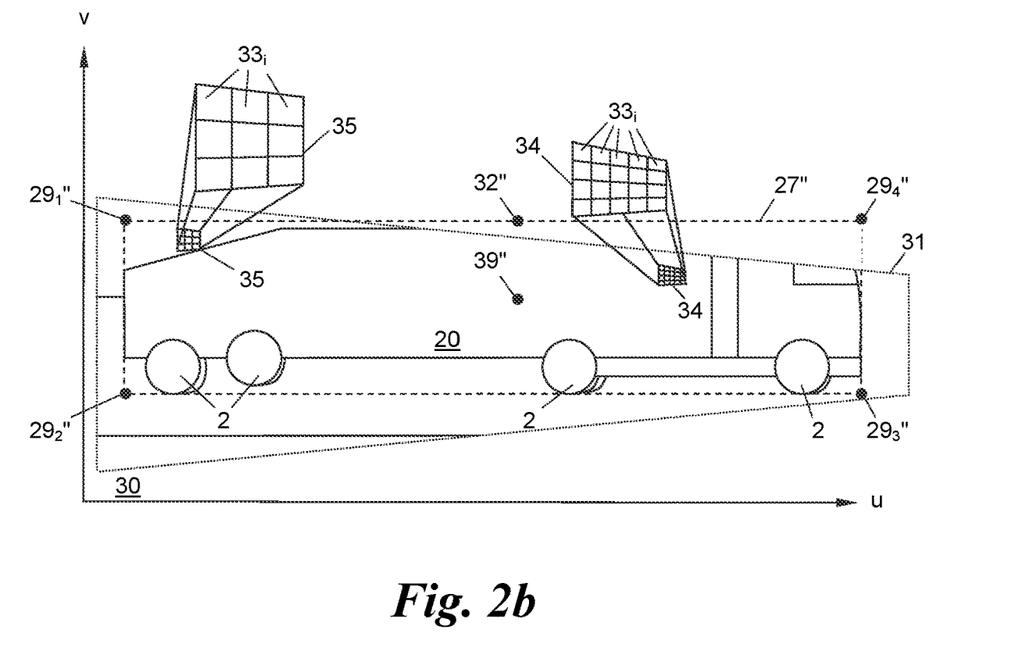
FIG. 2b a destination 2D image plane with a perspective-corrected destination 2D image obtained from the source 2D image of FIG. 2a according to the method of the disclosed subject matter.

In step 108 following step 107, a rectangle 27", whose four corners are called destination corner points $29_1''$-$29_4''$ in the following, is defined in the destination 2D image plane 30 (FIG. 2b). The size of the rectangle 27" is chosen in accordance with the distance mentioned above, and its orientation is for example horizontal. In one embodiment, the rectangle 27" and its destination corner points $29_1''$-$29_4''$ are defined in dependence of the actual ("real world") size of the bounding box size 27, as the distances between the four bounding box side corner points $29_1$-$29_4$ are known from the 3D representation 13, see the dashed arrow from the output of step 106 to step 108. This will later on allow to analyse "standardized" destination 2D images 31 in the destination 2D image plane 30 to more easily detect vehicle wheels therein, e.g., by a neural network, as will be explained further on.

In step 109 following steps 106 and 108, a perspective-correcting projective transformation between points in the source 2D image plane 19 and points in the destination 2D image plane 30 is calculated on the basis of a one-to-one correspondence between each of the four source corner image points $29_1'$-$29_4'$ and the respective destination corner image point $29_1''$-$29_4''$. The projective transformation is, e.g., calculated by determining the parameters $h_{ij}$ (i=1, 2, . . . ; j=1, 2, . . . ) of a transformation matrix H $$c \cdot p_d = c \cdot \begin{pmatrix} u \\ v \\ 1 \end{pmatrix} = \begin{bmatrix} h_{11} & h_{12} & h_{13} \\ h_{21} & h_{22} & h_{23} \\ h_{31} & h_{32} & h_{33} \end{bmatrix} \cdot \begin{pmatrix} x \\ y \\ 1 \end{pmatrix} = H \cdot p_s$$

with
- $p_s$ . . . a point in the source 2D image plane 19;
- x,y . . . the coordinates of $p_s$;
- $p_d$ . . . a point in the destination 2D image plane;
- u,v . . . the coordinates of $p_d$;
- c . . . a scaling parameter;

and employing the constraint $\|H\|=1$, wherein $\|\cdot\|$ denotes a norm.

Optionally, additional points, e.g., a centre point of the bounding box side 27 or a point 32 on an upper edge of the bounding box side 27 are determined in step 105, identified in the source 2D image plane 19 using the mapping in step 106 and defined in the destination 2D image plane 30 in step 108, and then the projective transformation is calculated in step 109 using the additional source image points 32' and corresponding additional destination image points 32" together with the four source corner image points $29_1'$-$29_4'$ and corresponding destination corner image points $29_1''$-$29_4''$ such that the parameters $h_{ij}$ in the above-mentioned equation can be derived from an overdetermined system.

In subsequent step 111, the projective transformation calculated in step 109 can then be used to transform the source 2D image 17 into the destination 2D image 31, or, more specifically, the source 2D image pixels $18_i$ of the source 2D image 17 to destination 2D image pixels $33_i$ of the destination 2D image 31. The destination 2D image 31 will then show a perspective-corrected view of the side 5 of the vehicle 3, see FIG. 2b.

In the transforming step 111 any number of pixels $18_i$ of the source 2D image 17 may be transformed, e.g., all of the pixels $18_i$ of the source 2D image 17, the lower half of the source 2D image 17, or all those source 2D image pixels $18_i$ which show points of the side 5 that are within a vertical distance of, e.g., 2 m, above a lower edge of the bounding box side 27 (e.g., as determined using the mapping and/or the projective transformation). In a variant of the method, in a preceding selection step 110 at least those pixels $18_i$ in the source 2D image 17 which lie within the tetragon 27' are selected, so that the whole portion of the vehicle side 5 captured by the camera 14 will be visible in the destination 2D image 31.

As illustrated in FIG. 2b, the perspective-corrected destination 2D image 31 usually will not be rectangular but trapezoidal. Therefore, the destination 2D image 31 may be cropped or enlarged ("padded") to have a rectangular form by cutting out destination image pixels $33_i$ and/or by padding additional (e.g., monochromatic) destination image pixels $33_i$ at the borders.

So far, by performing the steps 100-111, the recorded source 2D image 17 has been transformed to the perspective-corrected destination 2D image 31 using depth information about source corner image points $29_1'$-$29_4'$ obtained from the recorded 3D representation 13. In the final step 112 of the method, the wheels 2 of the vehicle 3 can now be detected by means of an image recognition process in the corrected destination 2D image 31.

In step 112 any image recognition process may be used to detect the wheels 2, e.g., a pattern recognition algorithm, a neural network, evolutionary algorithms, ensemble learning, linear/quadratic discriminant analysis (LDA/QDA), maximum entropy classifiers, decision trees/lists, kernel estimation, naïve Bayes classifiers, cluster analysis, etc. as well as combinations thereof. If, e.g., a neural network is used in the image recognition process to detect the wheels 2, this may be trained by providing a test set of perspective-corrected, standardised images of vehicle wheels. A section of the destination 2D image 31 corresponding to real world lengths, e.g., of 20 m×5 m, may be provided to the image recognition process in the detecting step 112. Alternatively, no real world lengths may be associated in the destination 2D image 31.

Optionally, the image recognition process in step 112 can additionally measure the size of a detected wheel 2, whether a detected wheel 2 is raised from the road 4 (see second wheel 2 from the left in FIGS. 1, 2a, 2b), whether a detected wheel is a "double" wheel (see third wheel 2 from the left in FIGS. 1, 2a, 2b) and/or determine the overall number of wheels 2, raised wheels 2 and/or double wheels 2 of the vehicle 3.

As shown in FIG. 2b, the pixel density in the destination 2D image 31 may be non-uniform, i.e., the front of the vehicle 3 is represented in a higher resolution than its rear, see fragmentary views 34, 35 of the pixel grid. To make the pixel density of the destination 2D image pixels $33_i$ in the destination 2D image 31 uniform, at least one of the following measures can be applied in step 111:
- interpolating additional destination 2D image pixels $33_i$ from the transformed destination 2D image pixels $33_i$ to densify sparsely populated regions (such as pixel grid fragment 35);
- averaging several transformed source 2D image pixels $33_i$ into one destination 2D image pixel $33_i$ to depopulate densely populated regions (such as pixel grid fragment 34).

Figure 3A:
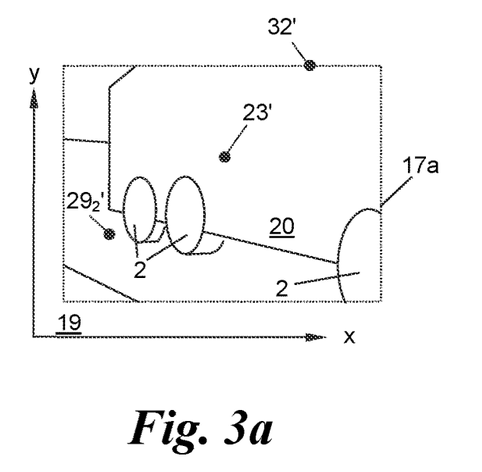
FIGS. 3a and 3b source 2D image planes with perspective-distorted source 2D images showing a portion of a vehicle at a second and a first position, respectively.
Figure 3B:
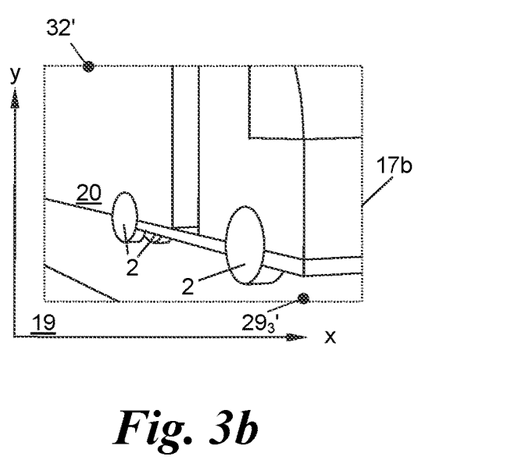

As can be seen in FIG. 2a, for a long vehicle 3, which needs a large source 2D image 17 to be recorded as a whole, the rear wheels 2 may be recorded heavily distorted and very small, resulting in a very poor resolution of the transformed wheels in the destination 2D image 31. To overcome this problem, in a further variant of the method shown in FIGS. 3a-3c, two smaller, less distorted source 2D images 17a, 17b for two different positions of the vehicle 3 at respective different times are recorded by the camera 14 (FIGS. 3a and 3b). For each of the two positions the steps 100-111 are performed, and the resulting two destination 2D images 31a, 31b are stitched to a stitched destination 2D image 36 (FIG. 3c).

Alternatively, the second source 2D image 17b may be recorded, at the same or a different recording time, by a second camera 14 from a different camera position $P_{CAM}$ and/or directed under a different angle of aperture Ω onto the section 7 and subsequently be used in steps 101-111 in the same way as described above to obtain the stitched destination 2D image 36.

Any image stitching algorithm known to the skilled person may be used including, e.g., key point detection, registration, calibration, alignment, compositing and blending, also utilizing the known real world lengths in the destination 2D images 31a, 31b. Moreover, in embodiments performing image stitching, parts of the vehicle 3 which are occluded in one destination 2D image 31a, 31b may be reconstructed in the stitched destination 2D image 36, e.g., by applying appropriate weights as described in the following.

Figure 3C:
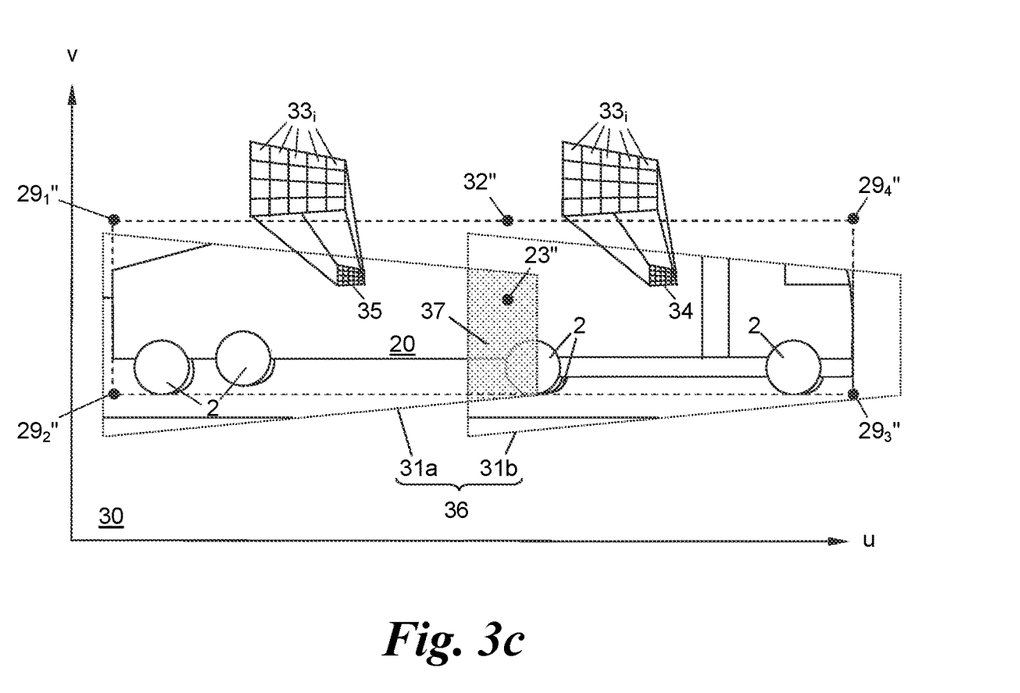
FIG. 3c a destination 2D image plane with a stitched destination 2D image comprised of two perspective-corrected destination 2D images obtained from the source 2D images of FIGS. 3a and 3b according to the method of the disclosed subject matter.

With reference to FIGS. 1 and 3c, in one embodiment stitching is performed by determining an overlapping region 37 between the destination 2D images 31a, 31b and assigning, for the destination 2D image pixels $33_i$ therein, weights which are then used to calculate the pixels $33_i$ of the stitched destination 2D image 36 in the overlapping region 37, e.g., according to $$pv_i = \frac{w_a \cdot pv_a + w_b \cdot pv_b}{w_a + w_b}$$

with $pv_i$ ... a value of a pixel $33_i$ in the stitched destination 2D image 31;

$pv_a, pv_b$ ... a value of a pixel $33_i$ in the first and second destination 2D images 31a, 31b, respectively; and $w_a, w_b$ ... the weights assigned to the pixels $33_i$ in the first and second destination 2D images 31a, 31b, respectively.

The weights $w_a$, $w_b$ may be determined, e.g., based on contrast, exposure, luminance etc. of the destination 2D images 31a, 31b, the quality or resolution of the 3D representation 13 at the corresponding position, vehicle occlusion, a smooth transition from one to the other destination 2D image 31a, 31b, etc.

Optionally, the weights $w_a$, $w_b$ are determined based on an angle of incidence α (FIG. 1) of a ray 38 from the camera position $P_{CAM}$ to a point 39, which corresponds to the position 39" of the pixel $33_i$ of the respective destination 2D image 31a, 31b, on the bonding box side 27. Said correspondence may, e.g., be obtained by using the mapping and the projective transformation and/or by utilizing the known real world lengths in the respective destination 2D image 31a, 31b. For example, a more straight view on the point 39 represented by the pixel $33_i$, i.e. a lower angle of incidence α, may result in a higher weight $w_a$, $w_b$ and a more oblique view, i.e. a higher angle of incidence α, may result in a lower weight $w_a$, $w_b$.

For example, the respective weight $w_a$, $w_b$ may be determined by $$w_{a,b} = \frac{1}{1+\alpha}$$

with $w_{a,b}$ ... the weight $w_a$ or $w_b$ to be determined; and
α ... the angle of incidence of the ray 38 onto the bounding box side 27.

Of course, it is possible that more than two destination 2D images 31a, 31b, ... are stitched together to a stitched destination 2D image 36 which is used in the detecting step 112. These more than two destination 2D images 31a, 31b, ... may overlap all, or just two by two, three by three, etc. in several separate regions 37 of the stitched destination 2D image 36. The weights $w_j$ (j=a, b, c, ... ) may then be used analogously as explained above, for example by employing the equation $$pv_i = \frac{\sum_j w_j \cdot pv_j}{\sum_j w_j}$$

In general, any number of cameras 14 directed from different camera positions $P_{CAM}$ and/or under different angles of aperture Ω may be used to record, at the same or different recording times, the different source 2D images 17a, 17b, ... for each of which the steps 100-111 are performed to derive respective destination 2D images 31a, 31b, ....

CONCLUSION

The disclosed subject matter is not restricted to the specific embodiments described above but encompasses all variants, modifications and combinations thereof that fall within the scope of the appended claims.

What is claimed is:

1. A method for detecting wheels of a vehicle on a road, said wheels being
visible on a side of the vehicle, comprising, for a first position of the vehicle on the road:
a vehicle classification sensor from a sensor position, in a given coordinate system, onto a section of the road and recording, with the vehicle classification sensor, a 3D representation of at least a part of the vehicle passing the section;
directing a first camera from a first camera position, in the given coordinate system, onto the section and recording a source two-dimensional (2D) image, comprised of pixels representing points in a source 2D image plane, of at least a lower portion of said vehicle side, said camera being calibrated by a mapping between world points in the given coordinate system and image points in said source 2D image plane;
determining, in the given coordinate system, a bounding box circumscribing the three-dimensional (3D) representation, a side of the bounding box corresponding to said vehicle side, and the four corner points of said bounding box side;
identifying, using said mapping, image points corresponding to said four corner points in said source 2D image plane as source corner image points;
defining a destination 2D image plane in the coordinate system, and the four corner points of a rectangle in the destination 2D image plane as destination corner image points;
calculating a projective transformation between the source corner image points and the destination corner image points;
transforming, using the projective transformation, source 2D image pixels to destination 2D image pixels of a first destination 2D image; and detecting the wheels of the vehicle using the first destination 2D image by means of an image recognition process; and detecting the wheels of the vehicle using the first destination 2D image by means of an image recognition process.

2. The method according to claim 1, wherein said bounding box side is determined as a vertical side of the bounding box which is closest to the camera position.

3. The method according to claim 1, wherein a vehicle movement vector is measured by the vehicle classification sensor and said bounding box side is determined as a vertical side of the bounding box which is parallel to the vehicle movement vector and faces the camera.

4. The method according to claim 1, wherein the image recognition is carried out by means of a neural network trained on perspective-corrected, standardised images of vehicle wheels.

5. The method according to claim 4, wherein, by means of the image recognition process, for each detected wheel it is detected whether this wheel is raised from the road.

6. The method according to claim 4, wherein, by means of the image recognition process, for each detected wheel it is detected whether this wheel is a double wheel.

7. The method according to claim 1, wherein the detected wheels are counted.

8. The method according to claim 1, wherein an additional point is determined, a corresponding additional source image point is identified using said mapping, and said projective transformation is calculated also between the additional source image point and a corresponding additional destination image point.

9. The method according to claim 1, further comprising: selecting at least those pixels in the source 2D image which lie within a tetragon spanned by the source corner image points for said transforming.

10. The method according to claim 1, wherein, in the step of transforming, additional destination 2D image pixels are interpolated from the destination 2D image pixels.

11. The method according to claim 1, wherein, in the step of transforming, several transformed source 2D image pixels are averaged to a destination 2D image pixel.

12. The method according to claim 1, comprising: repeating the steps of recording, determining, identifying, defining, calculating and transforming, for a second position of the vehicle or with a second camera from a second position, to obtain a second destination 2D image; and stitching the first and the second destination 2D images to a stitched destination 2D image; wherein said step of detecting is carried out using the stitched destination 2D image.

13. The method according to claim 12, wherein, for said stitching, an overlapping region between the first and second destination 2D images is determined and for destination 2D image pixels therein weights are assigned which are used to calculate pixels in the overlapping region in the stitched destination 2D image.

14. The method according to claim 13, wherein the weight for a destination 2D image pixel is calculated by:
determining, in the 3D representation, a point corresponding to said pixel, a ray from the camera position to said point, and an angle of incidence of said ray onto said bounding box side; and
calculating said weight in dependence of said angle.

15. The method according to claim 1, further comprising: selecting all pixels in the source 2D image for said transforming.

16. The method according to claim 5, wherein, by means of the image recognition process, for each detected wheel it is detected whether this wheel is a double wheel.

17. The method according to claim 8, wherein said additional point is on an edge of said bounding box side.

18. The method according to claim 2, further comprising: selecting at least those pixels in the source 2D image which lie within a tetragon spanned by the source corner image points for said transforming.

19. The method according to claim 3, further comprising: selecting at least those pixels in the source 2D image which lie within a tetragon spanned by the source corner image points for said transforming.

20. The method according to claim 2, comprising:
repeating the steps of recording, determining, identifying, defining, calculating and transforming, for a second position of the vehicle or with a second camera from a second position, to obtain a second destination 2D image; and
stitching the first and the second destination 2D images to a stitched destination 2D image;
wherein said step of detecting is carried out using the stitched destination 2D image.

21. The method according to claim 3, comprising:
repeating the steps of recording, determining, identifying, defining, calculating and transforming, for a second position of the vehicle or with a second camera from a second position, to obtain a second destination 2D image; and
stitching the first and the second destination 2D images to a stitched destination 2D image;
wherein said step of detecting is carried out using the stitched destination 2D image.

* * * * *

UNITED STATES PATENT AND TRADEMARK OFFICE
CERTIFICATE OF CORRECTION

| | | |
|---|---|---|
| PATENT NO. | : 11,769,331 B2 | Page 1 of 1 |
| APPLICATION NO. | : 17/326265 | |
| DATED | : September 26, 2023 | |
| INVENTOR(S) | : Björn Crona et al. | |

It is certified that error appears in the above-identified patent and that said Letters Patent is hereby corrected as shown below:

In the Claims

In Column 12, Line 35, in Claim 1, before "a vehicle" insert -- directing --.

Signed and Sealed this
Thirtieth Day of July, 2024

Katherine Kelly Vidal
*Director of the United States Patent and Trademark Office*